(No Model.)
H. W. MOORE.
VEHICLE SPRING.
No. 314,702.　　　　　　　　Patented Mar. 31, 1885.
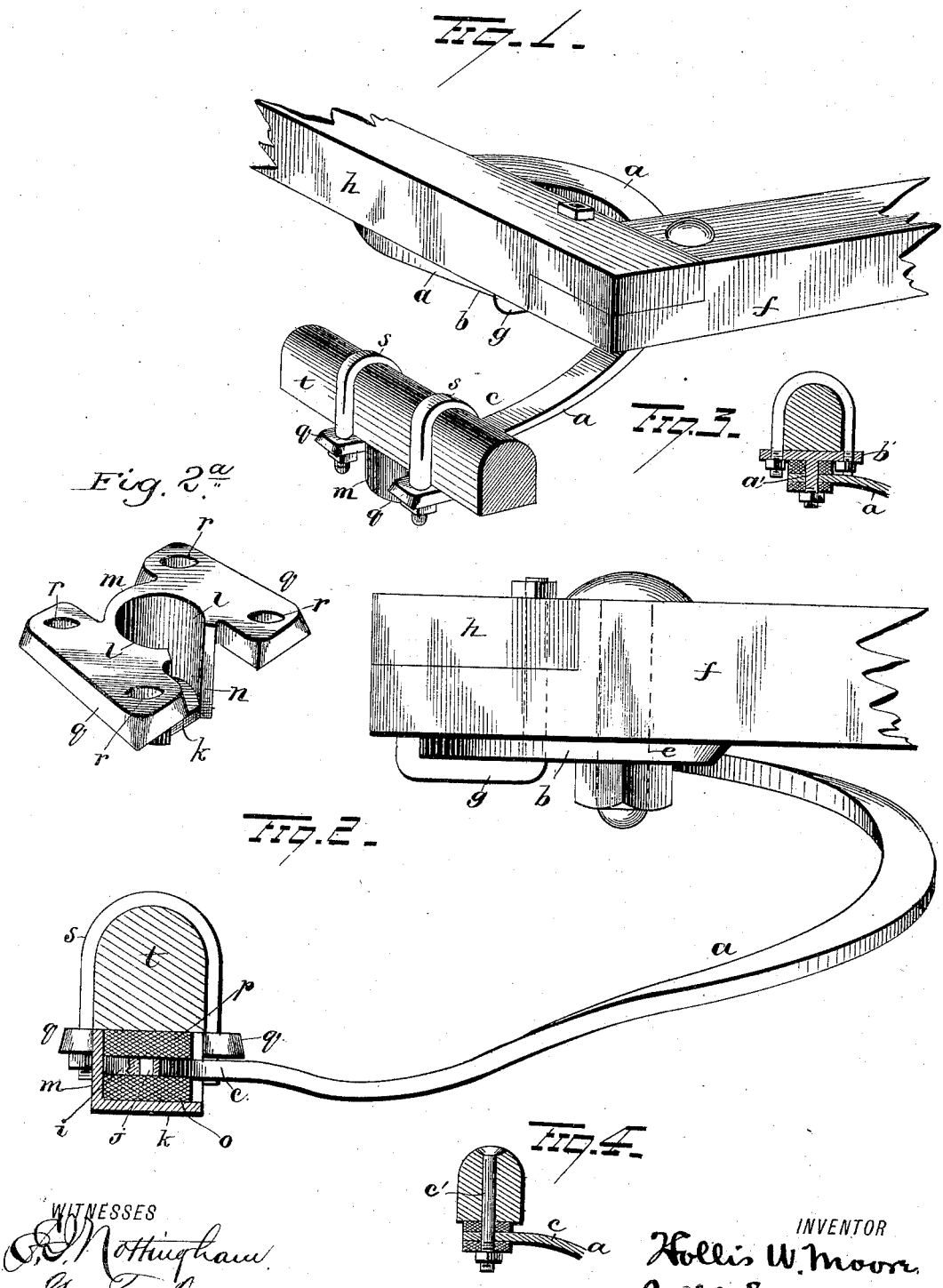

UNITED STATES PATENT OFFICE.

HOLLIS W. MOORE, OF OLEAN, NEW YORK.

VEHICLE-SPRING.

SPECIFICATION forming part of Letters Patent No. 314,702, dated March 31, 1885.

Application filed December 23, 1884. (No model.)

*To all whom it may concern:*

Be it known that I, HOLLIS W. MOORE, of Olean, in the county of Cattaraugus and State of New York, have invented certain new and useful Improvements in Springs; and I do hereby declare the following to be a full, clear, and exact description of the invention, such as will enable others skilled in the art to which it appertains to make and use the same.

My invention relates to an improvement in springs, the object of the same being to provide a vehicle-spring which shall be simple and economical in construction and durable and efficient in use; and with these ends in view my invention consists in a coiled spring one end of which is adapted to be attached to a wagon-frame, and the opposite end bent outwardly in such form as to cross the first-mentioned end at or nearly at right angles thereto, and to be secured to a side bar or other suitable support.

My invention further consists in certain features of construction and combinations of parts, as will be hereinafter described, and pointed out in the claims.

In the accompanying drawings, Figure 1 is a perspective view of the spring. Fig. 2 is a view in end elevation of the same. Fig. 2ª is a detached view of the spring-plate. Figs. 3 and 4 are modifications of my improvement.

$a$ represents a coil-spring which is made of any suitable spring metal, and may be round, square, or in any preferred form in cross-section. The spring is preferably shaped as shown in the drawings—that is, with one end, $b$, thereof L-shaped, and the opposite end, $c$, gradually bent around in curved form until it crosses the first-named end, and at or nearly at right angles thereto, and extends outwardly a short distance therefrom. The end $b$ of the spring is provided with a hole, $e$, to admit a suitable bolt, by means of which it is secured to the bottom frame, $f$, of the vehicle-body, and the spring is further secured by means of the clip $g$, which enters the side rail, $h$, and embraces the spring, as shown.

The spring as above described forms one of a set—usually four in number—located at the four corners of the wagon-frame, and arranged in symmetrical front and rear pairs.

My preferred mode of securing the spring to the side bar consists in providing the outer or free end thereof, $c$, with an enlarged head, $i$, which may be round or other shape, and providing the said head with a perforation, $j$.

The spring-securing plate $k$ is made of any suitable metal, and is formed with the outwardly-curved sides $l$ and the back $m$, the forward part of the plate being left open, as shown at $n$, for the purpose of accommodating the end $c$ of the spring. It will be observed that the opening $n$ is narrower than the sides $l$. Thus when the head $i$ is in position in the plate the head $i$, being larger than the opening, is held in position against lateral displacement. For the purpose of preventing all jar being communicated to the body of the vehicle and preventing the spring becoming loose and rattling, the bottom of the plate is provided with the rubber bed $o$, on which the head $i$ of the spring rests. When the spring is thus cushioned and placed in position, over the head $i$ is placed a rubber cushion, $p$, against the upper surface of which rests the side bar of the vehicle.

The ends of the plate $k$ are provided with the flanges $q$, having the bolt-holes $r$ in their ends, adapted to accommodate the ends of the clips $s$, which embrace the side bar, $t$, and hold the same in close contact with the spring. The ends of the clips are screw-threaded, and secured to the flanges by means of suitable bolts or thumb-screws adapted to register therewith. An additional fastening may be afforded by centrally perforating the rubber-cushions $o$ and $p$ and the bottom of the plate $k$ and passing a bolt therethrough and securing the same to the side bar, $t$.

The modification shown in Fig. 3 dispenses with the socket-plate for the reception of the head of the spring, and the spring is secured to the side bar by means of a pin, $a'$, formed on the plate $b'$, which passes through a hole formed in the end of the spring. The rubber cushions are used in this device in the same manner as in the one described above, and the staple is secured to the plate as described above.

The modification shown in Fig. 4 dispenses with the plates and staples, and the side bar is secured to the spring by means of the bolt $c'$, which passes through the side bar and the cushions and spring, and is held in place by means of a suitable nut or other device; or the end *c* may be secured in the ordinary manner by means of a stirrup, pin, or bolt.

It will be seen that in use my improved spring will support all parts of a vehicle equably and afford a constant support to the corners thereof.

While I have described my spring as applicable to a side-bar vehicle, I would have it understood that the use thereof is not limited thereto, as the same can be used on vehicles of any construction.

Having fully described my invention, what I claim as new, and desire to secure by Letters Patent, is—

1. A wagon coiled spring the free or outer end of which crosses the upper or inner end at or nearly at right angles thereto, substantially as set forth.

2. The combination, with a side bar and body-frame, of a coil-spring the outer end of which crosses the inner end at or nearly at right angles, the said upper end being rigidly secured to the body, and the opposite end yieldingly secured to the side bar, substantially as set forth.

3. The combination, with a side bar, a socketed plate secured to said side bar, and provided with a slot in one face thereof, and a vehicle-body, of the spring, bent substantially as described, and secured at one end to the body, and provided at its opposite end with an enlarged head, which latter rests within the socket in the plate, substantially as set forth.

4. The combination, with a side bar and body-frame, of a coil-spring one end of which is adapted to be rigidly secured to the body, and the opposite end bent around in curved form, crossing the said end portion at or nearly at right angles thereto, and extending outwardly a short distance therefrom, substantially as set forth.

5. The combination, with a side bar and body-frame, of a coil-spring one end of which is adapted to be rigidly secured to the body, and the opposite end yieldingly secured to a socket-plate, and rubber cushions located above and below the said end in the hollow plate, substantially as set forth.

6. A wagon-spring one end of which is L-shaped, for attaching it securely to the body, and the opposite end provided with an eye for attaching it to the side bar by means of a bolt, pin, or stirrup, the shape of the spring being such as to form a loop, the side-bar end crossing the body end below and at or nearly at right angles thereto, substantially as set forth.

In testimony whereof I have signed this specification in the presence of two subscribing witnesses.

HOLLIS W. MOORE.

Witnesses:
 FRANK RUMSEY,
 JOHN T. BREXTIS.